United States Patent
Koster et al.

(10) Patent No.: US 6,631,732 B1
(45) Date of Patent: Oct. 14, 2003

(54) PUMP-OVER FERMENTATION TANK AND METHODS

(76) Inventors: Stephen F. Koster, 7192 Dry Creek Rd., Healdsburg, CA (US) 95448; Mark A. Nilson, 4370 Fairway Dr., Rohnert Park, CA (US) 94928

( * ) Notice: Subject to any disclaimer, the term of this patent is extended or adjusted under 35 U.S.C. 154(b) by 162 days.

(21) Appl. No.: 09/927,986

(22) Filed: Aug. 10, 2001

(51) Int. Cl.⁷ .............................................. C12G 1/032
(52) U.S. Cl. ........................ 137/571; 251/120; 99/276; 99/277.1
(58) Field of Search ..................... 137/571; 251/120; 99/276, 277, 277.1; 426/7, 15, 51

(56) References Cited

U.S. PATENT DOCUMENTS

| | | | | |
|---|---|---|---|---|
| 3,478,669 A | * | 11/1969 | Lanes | 99/276 |
| 3,871,272 A | * | 3/1975 | Melandri | 99/276 |
| 4,002,111 A | * | 1/1977 | Pujol | 99/276 |
| 4,593,612 A | * | 6/1986 | Rieger | 99/277.2 |
| 4,969,391 A | * | 11/1990 | Haulot | 99/277.1 |
| 6,279,457 B1 | * | 8/2001 | Francia | 99/277.1 |

FOREIGN PATENT DOCUMENTS

| | | |
|---|---|---|
| DE | 297 21 737 U1 | 3/1998 |
| DE | 198 37 201 A1 | 2/1999 |
| DE | 10015952 A1 * | 10/2000 |
| DE | 10111968 A1 * | 10/2001 |
| FR | 2405300 A1 * | 5/1979 |
| FR | 2512056 A1 * | 3/1983 |

* cited by examiner

Primary Examiner—John Rivell
(74) Attorney, Agent, or Firm—Scott Hewett

(57) ABSTRACT

A pump-over fermentation tank has a valve between the pump-over chamber and fermentation chamber providing multi-directional diffusion of the pump-over liquid into the fermentation or extraction chamber. The valve is opened slowly for irrigation of the fermentation cap and is opened rapidly to achieve mixing of the contents in the fermentation chamber. The valve is self-centering in the near-closed position, and in a particular embodiment has diffusers on the perimeter of the valve to direct the pump-over liquid to different regions of the surface of the contents in the fermentation chamber.

16 Claims, 6 Drawing Sheets

PUMP-OVER FERMENTATION TANK AND METHODS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

The invention relates generally to fermentation vessels, such as are used in the wine industry, and more particularly to a fermentation vessel that circulates a portion of liquid from the fermentation chamber over the top of the contents in the fermentation chamber.

Red wine is typically made by crushing dark-skinned grapes and extracting color and flavor components from the grape skins and pulp by allowing the crushed grapes, including their juice, to sit for a period of time. This extraction time is followed by a fermentation stage where yeast converts sugar in the grape juice to alcohol and carbon dioxide. The fermentation can also facilitate in extracting flavor and color from the skins. This process is often referred to as "maceration". The wine or partially fermented grape juice ("must") is typically pressed from the skins, stems, and other large solids, collectively referred to as pomace, and transferred to a secondary vessel where further processing occurs.

During the extraction period the large solids typically float to the surface of the crushed grapes to form a "cap". This cap can be relatively thick and portions can partially dry out, which diminishes extraction. If fermentation is occurring, the carbon dioxide formed by the yeast can also carry solids to the surface because the gas bubbles nucleate on the solids and carry them to the top of the liquid. Heat is also generated during fermentation and the drier portion of the cap can overheat, generating undesirable flavor components.

Thus, many techniques have been developed to keep the cap moist to improve the extraction of flavor and color. The "grape stomp", for example, is directed at submerging the cap into the must, rather than crushing fresh grapes, as is often thought. Other manual methods exist, such as large plungers that the winemaker can use to push portions of the cap into the must. Many of these methods can be tedious and imprecise. The imprecision can lead to a lack of process control that can affect the quality of the wine produced. Therefore, other methods have been developed to assist in the extraction and fermentation processes of red wine making.

One approach uses a pump-over fermentation tank. One type of pump-over fermentation tank has a pump-over chamber above a fermentation chamber, with a valve in a septum separating the chambers. A pump transfers must from the fermentation chamber into the pump-over chamber, where it accumulates until a disk valve is opened, releasing the must over the cap. If only a little must has accumulated in the pump-over chamber, then the cap is predominately moistened when the valve is opened. If more must has been accumulated, then the flow from the upper chamber to the lower might be sufficient to mix at least some of the cap back into the must.

However, the disk valve tends to divert much of the must from the pump-over chamber to the edge regions of the cap, if not to the sidewall of the fermentation chamber, until the head of liquid in the pump-over chamber diminishes, decreasing the spray radius from the disk valve. Spraying the sidewall of the fermentation chamber precludes spraying the cap with that liquid, and is inefficient in terms of pumping.

Similarly, if mixing of the cap is desired and a large amount of liquid has been accumulated in the pump-over chamber, when the disk valve is opened much of the liquid is merely sprayed on the sidewall of the fermentation tank. The force of this liquid is primarily sideways, rather than directed down at the cap. Thus, this arrangement concentrates the pump-over liquid at the perimeter of the cap, rather than at the cap surface.

BRIEF SUMMARY OF THE INVENTION

A pump-over fermentation tank includes a fermentation chamber separated from a pump-over chamber by a septum. A pump pumps liquid from the fermentation chamber into the pump-over chamber through a pump-over pipe. A chamber valve between the chambers can be closed to separate the chambers and allow accumulation of liquid in the pump-over (upper) chamber and opened to dispense the liquid onto the surface of the contents in the fermentation chamber. In one embodiment, the chamber valve has a movable valve member with diffusers disposed on a perimeter of the movable valve member so as to direct liquid from the pump-over chamber over the surface of the contents in the fermentation chamber. In a particular embodiment, the diffusers are interspersed with notches. In a further embodiment, back diffusers direct liquid from the perimeter of the-movable valve member to the center of the tank:In In another or further embodiment, the movable member has a tapered face that mates with a valve seat to seal the chamber valve. The tapered valve face self-centers the movable member in the valve seat as the valve is closed. A valve actuator connected to the movable member can open the valve slowly or quickly. In other words, the valve actuator has at least two speeds.

In yet another embodiment of the present invention, a vortex impeller pump is used to pump the liquid from the lower chamber to the upper chamber. The vortex impeller pump is fabricated from stainless steel stock, rather than cast, to provide a smooth interior surface. It is believed this smooth interior surface avoids abrasion of the incidental solids transferred through the pump. In a further embodiment, the vortex impeller pump is powered by a low-speed electric motor. In a 3-phase, 60 Hz system, this low speed motor has a speed of about 1200 rpm, rather than the 1800 rpm of a standard-speed motor.

In a method according to an embodiment of the present invention, the chamber valve can be opened at different speeds to achieve different effects. The valve is opened slowly to irrigate the cap during extraction or fermentation, and can be opened quickly, which is usually done after accumulating liquid in the upper chamber, to mix the cap with the liquid in the lower chamber. In a particular embodiment, the extraction and fermentation processes are automated and controlled by a system controller or computer. The winemaker can program the system-controller to perform a selected number of irrigations over an extraction period. The controller then pauses to allow the winemaker to inoculate the crushed grapes, and enters a command to continue the process. The controller can be programmed to perform a series of irrigations during the fermentation period, and can also be programmed to accumulate must in the upper chamber to be rapidly dumped into the lower chamber, mixing the cap.

DETAILED DESCRIPTION OF THE INVENTION

I. Exemplary Fermentation System

Figure 1A:
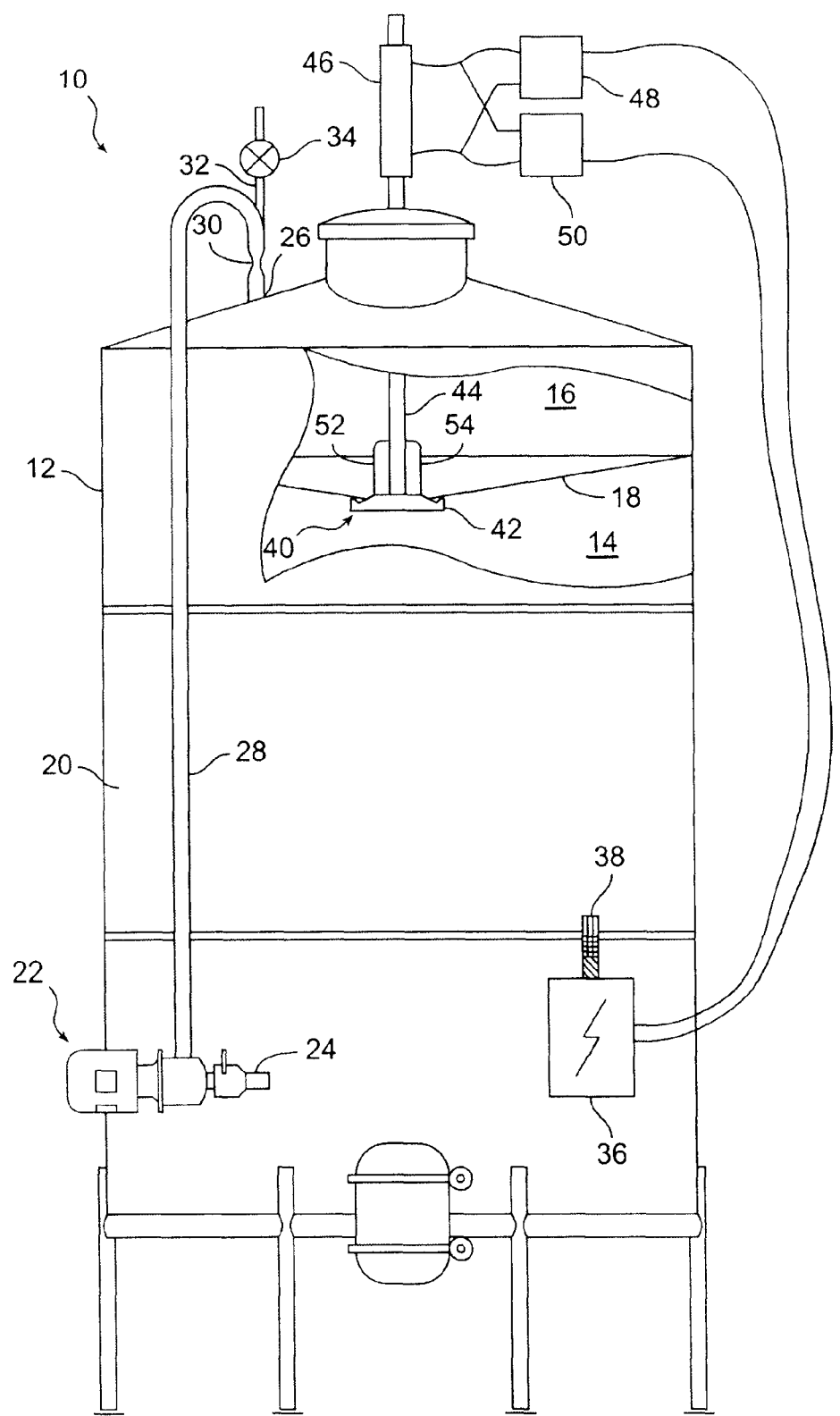
FIG. 1A is a simplified side view with partial cut-away of a pump-over fermentation tank according to an embodiment of the present invention.

FIG. 1A is a simplified side view with partial cut-away of a pump-over fermentation tank system 10 according to an embodiment of the present invention. A fermentation tank 12 includes a fermentation chamber 14 and a pump-over chamber 16. The chambers are separated by a septum 18. The chambers and septum are typically fabricated out of stainless steel sheet by rolling, stamping, bending, and welding, but many parts of the fermentation tank could be made out of other materials, such as food-grade plastic or even wood. However, stainless steel and plastics are generally desirable for their cleaning and sterilization characteristics, as well as not imparting undesirable flavors to the must. One type of suitable plastic is ultra-high molecular weight polyethylene, commonly referred to as food-grade "UHMW". A heat-exchanger jacket 20 is often provided to control the temperature of the must, which might be warmed during some portions of the operation and cooled during others.

A vortex impeller pump 22 pumps juice or partially fermented juice ("must") from an outlet 24 in the fermentation chamber 14 to an inlet 26 in the pump-over chamber 16 through a pump-over pipe 28. A venturi 30 with a center aeration tube 32 is at the end of the pump-over pipe. A venturi valve 34 controls whether air or other gas is admitted through the aeration tube. The venturi valve 34 is electronically controlled by the system controller 36, which is generally a computer with a readout, indicator lights 38, and a keyboard and switches, operating the fermentation tank according to a computer-readable program stored in the system controller or provided to the system controller from a computer-readable storage device. Alternatively, the fermentation tank system can be controlled from a stand-alone general-purpose computer programmed to control the fermentation tank system, or a remote computer, including a networked computer, and in some embodiments, the fermentation system can be operated without a system controller, such as by switches or even by manually operating components. The details of the system controller and the control lines from the system controller to the venturi valve and other system components are not shown for clarity of illustration.

A chamber valve assembly 40 in the septum 18 between the chambers controls the flow of liquid from the pump-over chamber 16 into the fermentation chamber 14. The chamber valve assembly includes a tapered conical valve face on a movable valve member, which in this embodiment is a metering valve in the form of a disk or plate 42 that contacts a valve seat. The valve face and mating portion of the valve seat are angled at 45 degrees from the top surface of the valve. Other angles could be chosen. The valve plate is made of food-grade UHMW plastic, but could be made of other plastics or materials. The UHMW plastic provides good strength, slight deformation to allow sealing of the valve, and is relatively easy to machine.

The valve plate is suspended on a drop rod 44 actuated by a pneumatic cylinder 46. Other actuators, such as electric motors, could be used. In a particular embodiment the valve opening is about 12 inches in diameter and the drop rod is about 3 inches in diameter and is made from stainless steel tubing. The pneumatic cylinder provides up to 6 inches of vertical travel, and is can be operated at different speeds.

In one embodiment, the fermentation system has two separate pneumatic control circuits 48, 50 selected by the system controller 36 according to the desired speed of opening of the chamber valve. One control circuit slowly opens the chamber valve at a rate of 4–5 sec. per inch, while the other control circuit rapidly opens the chamber valve at a rate of about 0.1–0.2 sec. per inch. These rates are exemplary for a particular embodiment having a 12-inch chamber valve and a pump-over chamber capacity of about 900 gallons, which is about 15% of the total volume of the tank. Other rates may be appropriate for other embodiments. In general, the fast rate is at least 20 times the slow rate, which allows thorough moistening during the irrigation phase and mixing of the cap with the liquid during the mixing phase. In an alternative embodiment, a single control circuit operates the chamber valve according to one of a number of speeds as selected by the system controller.

Vanes 52, 54 hold the drop rod 44 and hence the chamber valve plate in the center of the valve opening when the valve is fully opened. Three or more vanes can be used center the drop rod. When the valve closes, the vanes guide the conical valve face to contact the valve seat, which self-centers to seal the chamber valve. In conventional chamber valves using a disk, the disk can misalign laterally when closing, even with centering vanes, allowing leakage from the pump-over chamber to the fermentation chamber. Another issue that arises with valve disks is that a rubber O-ring or gasket is typically provided to facilitate sealing. These components often lie in a groove or other feature that can trap material and serve as a source of contamination, and that can be difficult to thoroughly clean and sterilize.

Figure 1B:
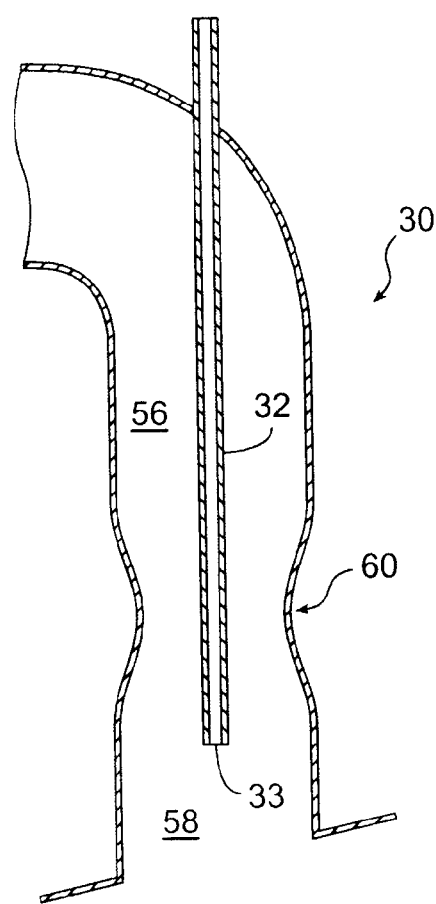
FIG. 1B is a simplified diagram of a venturi according to an embodiment of the present invention.

FIG. 1B is a simplified cross section of the venturi 30 showing details of the aeration tube 32 according to an embodiment of the present invention. The venturi includes a high-pressure chamber 56, a low-pressure chamber 58, and a constricted section 60 between the high-pressure chamber and the low-pressure chamber. The term "high pressure" relates to the relative pressure compared to the low-pressure chamber. Liquid pumped through the venturi is accelerated in the constricted section to maintain constant volume flow. In other words, the constricted section is a high-velocity section. While some line resistance arises due to the venturi, it is not significant.

Conventional aerators use a throttle plate in the pump-over line and admit air in the "dead" space on the downstream side of the throttle plate. The throttle plate is essentially a transverse plate in the pump-over line with a tube extending about 3 inches in the downstream direction from the transverse plate. The throttle plate constricts the cross section of the pump-over line, and generally limits the volume of liquid flowing through the tube so that the dead space forms. An aspirator tube is positioned to have its outlet between the down-stream side of the transverse plate and the outlet of the extension tube. This entrains aspirated air into the stream of must after it has passed through the throttle plate. The pump over line extends about 18 inches beyond the tube into the upper chamber and the flow of liquid through this section of the line might create a vacuum that draws air through the aspirator tube.

In comparison, a venturi according to the present invention injects air directly into the must at or near the low-pressure section of the venturi. The aeration tube is positioned essentially in the center of the circular venturi, with its outlet 33 generally within or near the low-pressure section. This arrangement provides a number of advantages. First, the outlet of the aerator tube is roughly in the center of the fluid flow, providing good exposure of the injected gas to the must in a circular fashion around the perimeter of the tube. Second, the outlet can be positioned near the high-velocity region of the venturi, i.e. near the constricted section, to efficiently draw air or other gas through the aerator tube. Third, injecting the air directly into the liquid rather than entraining air from a dead space as with prior techniques achieves superior mixing of the gas and liquid, thus facilitating saturation of the liquid with the desired dissolved gas(es). Fourth, if the air is provided on the "upstream" side of the low-pressure chamber 58 of the venturi, some decrease in pressure may occur beyond the outlet of the venturi tube, resulting in the injected gas initially contacting the liquid in a relatively compressed state, and then expanding as the mixture flows to a lower pressure region. It is believed this further facilitates saturation of the must with the desired gas(es), typically oxygen from the air. In a particular embodiment, the high-pressure chamber of the venturi has an inside diameter of about 3 inches, matching the diameter of the pump-over pipe, and the constricted section has a minimum diameter of about 2.5 inches.

Figure 1C:
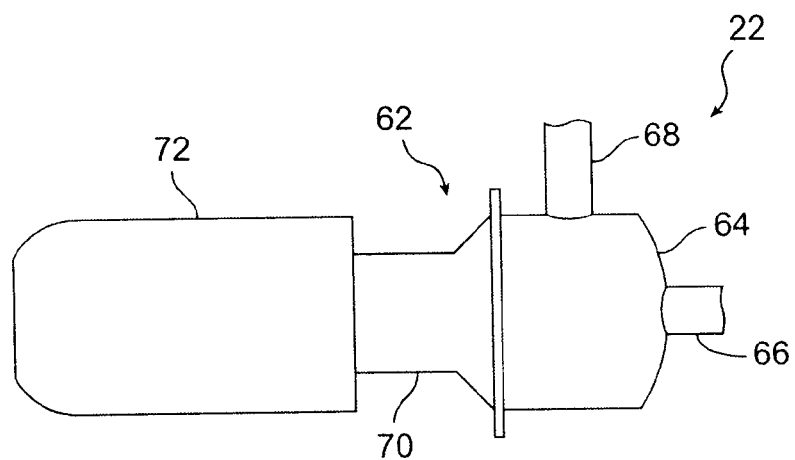
FIG. 1C is a simplified side view of a vortex impeller pump according to an embodiment of the present invention.

FIG. 1C is a simplified side view of a vortex impeller pump 22 according to an embodiment of the present invention. In a conventional vortex impeller pump, the pump body is made of cast stainless steel. Unfortunately, such castings are typically rough (e.g. sand castings), and might contain pores. It is believed that roughness and porosity can make thorough cleaning and sterilization of the pump difficult. Additionally, it is believed that the rough internal surface of the pump can contribute to abrasion of solids transferred through the pump, which can result in undesirable flavor or odor components being released into the must.

One reason a vortex impeller pump is chosen for pumping must in a fermentation tank is that there is relatively little contact between the must and the impeller, which is recessed from the vortex chamber. It is almost unavoidable to draw solids, such as stems, skins, and seeds into the pump, and desirable not to break these solids apart, which could release bitter or otherwise objectionable components. Therefore, a pump body with a rough interior surface is undesirable.

A vortex impeller pump according to an embodiment of the present invention has a pump body 62 with a smooth, relatively pore-free internal surface. The pump body is fabricated from stock stainless steel sheet and tubing, which has a relatively smooth surface in the as-fabricated condition. The vortex chamber 64 is pressed from stainless steel sheet metal and has an aspect ratio of diameter to depth of about 2.66:1.0. In a particular embodiment the diameter is about eight inches and the depth of the vortex chamber is about three inches. The inlet tube 66 is formed from stainless steel tubing and is welded to the vortex chamber with a sanitary weld and has a standard coupler on the inlet to couple to the fermentation tank. The outlet tube 68 is also formed from stainless steel tubing and is welded to the vortex chamber and attached to the pump-over pipe with another coupler. The impeller housing 70 is also pressed from stainless steel sheet. The impeller rotates within the impeller housing and creates a vortex in the vortex chamber that draws liquid into the center of the vortex and expels liquid at the perimeter of the vortex. Thus, most of the liquid transferred through the pump does not contact the impeller. Other fabrication methods might be employed to produce the vortex chamber and impeller housing, such as rolling, spinning, or stamping, to achieve the structure with a relatively smooth, pore-free interior surface.

The impeller is driven by an electric motor 72, which in one embodiment is a low-speed motor. As is known in the art, many industrial motors are three-phase motors running on alternating current at 60 or 50 Hz. In a 60 Hz system, a "standard" three-phase motor has a nominal shaft speed of 1800 rpm. Actual speed is typically a little bit less, such as 1725 rpm. Such a motor is used on conventional vortex impeller pumps. However, to reduce the incidental mechanical effects of the impeller on the material being pumped, an impeller pump according to an embodiment of the present invention uses a "low speed" motor and impeller. This impeller operates at a nominal speed of 1200 rpm, with an actual speed of about 1140 rpm. The motor and impeller are generally chosen according to the desired pumping rate, anticipated head, and inlet and outlet diameters. In a particular embodiment, the vortex impeller pump pumps about 125–200 gallons per minute through a 3-inch diameter pump-over pipe with a head of about 3–10 feet For purposes of this discussion, an impeller speed less than 1500 rpm is considered to be low speed.

II. Valve Plates and Cones

Figure 2A:
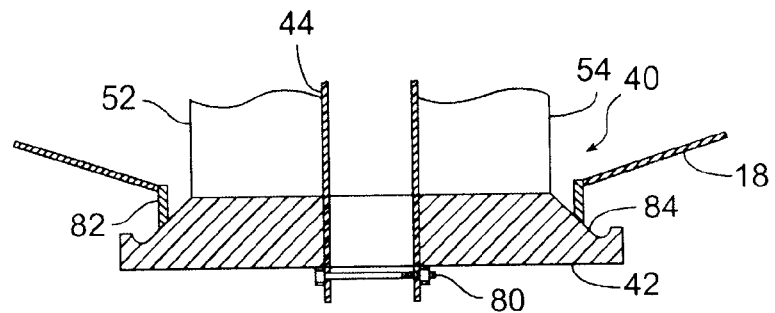
FIG. 2A is a simplified cross section of a portion of a fermentation tank according to an embodiment of the present invention.

FIG. 2A is a simplified cross section of a portion of a fermentation tank according to an embodiment of the present invention. The valve plate 42 is held on the tubular drop rod 44 with a pin or bolt 80. The valve seat 82 is machined to mate with the tapered face 84 of the valve plate, and the valve seat is sanitary welded to the septum 18, which is fabricated from stainless steel sheet and drains the pump-over chamber to the valve 40. Vanes 52, 54 keep the valve plate substantially centered when the valve is open, and only need to keep the valve plate sufficiently centered so that the valve seat will pick up the tapered face of the valve plate upon closing. Once the valve face is within the inner diameter of the valve seat, the valve plate self-centers, facilitating sealing of the chamber valve.

Figure 2B:
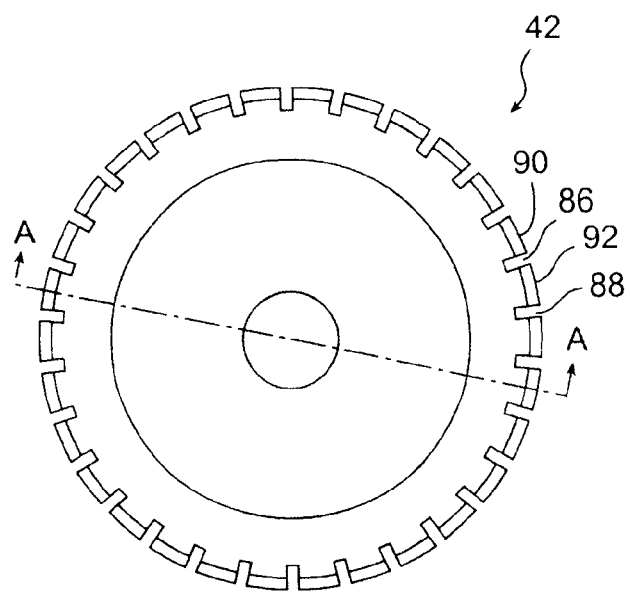
FIG. 2B is a simplified top view of a valve plate according to an embodiment of the present invention.

FIG. 2B is a simplified top view of a chamber valve plate 42 according to an embodiment of the present invention. The chamber valve plate is machined from UHMW plastic and has a number of slots 86, 88 cut into the perimeter of the valve plate. The slots allow must from the pump-over chamber to flow downwards onto the cap, moistening the cap near the center of the tank. Diffusers 90, 92 between the slots are shaped to divert the must further from the center, thus achieving a bi-directional diffusion of the pump-over liquid into the fermentation chamber. In one embodiment, the diffusers have nominally the same shape or section. In another embodiment, different diffusers have different shapes to achieve an even greater range of diffusion. In a further embodiment, back diffusers are provided to direct some portion of the must back under the valve plate.

Figure 2C:
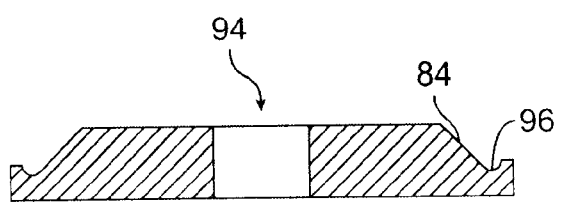
FIG. 2C is a simplified cross section of the valve plate illustrated in FIG. 2A.

FIG. 2C is a simplified cross section of the chamber valve plate illustrated in FIG. 2B through section line A. The drawings are merely exemplary and not to scale. The drop rod is received in the center opening 94. The relatively straight valve face 84 transitions to a curved diffuser section 96, which directs the liquid draining from the pump-over chamber up and outward. The direction of the liquid is determined by several factors, including the curve and rise of the diffuser sections. It can also be controlled by how much head is in the pump-over tank, and how far the chamber valve is opened. In one embodiment, the chamber valve is opened slowly, and the bi-directional diffusion, changing head, and changing valve opening operates to moisten essentially the entire cap.

Figure 2D:
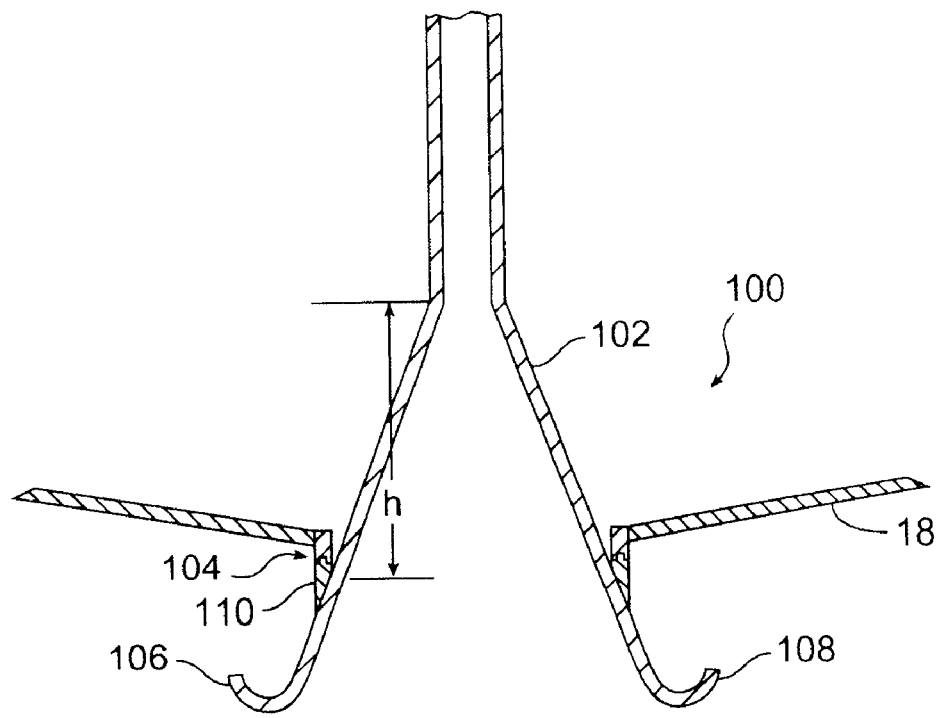
FIG. 2D is a simplified cross section of a valve cone according to an embodiment of the present invention.

FIG. 2D is a simplified cross section of an embodiment of a chamber valve 100 with a valve cone 102 as the movable valve member according to another embodiment of the present invention. The valve cone can be substituted for the valve plate 42 of FIG. 1A. This valve cone 102 is tapered from where the valve seat 104 contacts the valve cone when it is closed to a height h sufficient to insure centering of the valve cone upon closing. In one embodiment the taper is at least as high as the travel of the valve cone between the closed and fully opened positions. In another embodiment, the taper is less than the travel of the valve cone. In these embodiments, the centering vanes are not necessary, and do not interfere with the Coriolis effect (swirling) when draining the pump-over chamber.

The valve cone can be made from stainless steel sheet metal by stamping, rolling, welding, and similar methods. The diffusers 106, 108 can be shaped differently, and even bent after installation into the fermentation tank. In a particular embodiment, at least some of the diffusers are twisted about an axis in the plane of the sheet metal to achieve a multi-directional diffusion effect. To facilitate sealing, the valve seat 104 includes a UHMW insert 110 that mates with the valve cone. The valve seat does not have to be tapered, and may be rounded, for example.

Figure 2E:
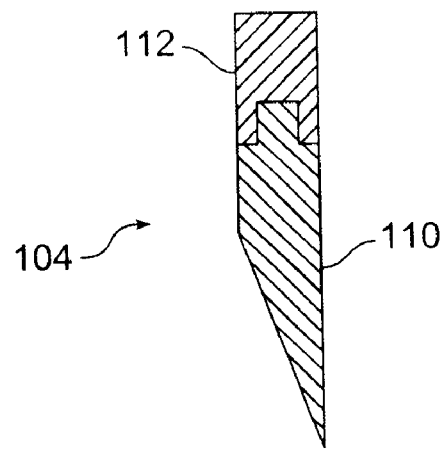
FIG. 2E is a simplified cross section of a valve seat according to an embodiment of the present invention.

FIG. 2E is an enlarged portion of the cross section illustrated in FIG. 2D showing the plastic insert 110 in the valve seat 104. The plastic insert is formed to provide a seal when brought in contact with a valve plate or cone, and is inserted into a machined ring of stainless steel 112, which is sanitary welded to the septum.

Figure 2F:
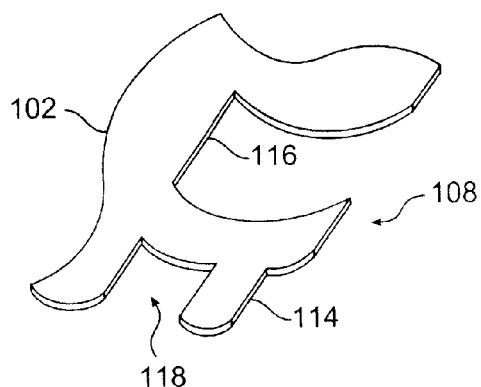
FIG. 2F is a simplified perspective view of a diffuser according to an embodiment of the present invention.

FIG. 2F is a simplified perspective view of a portion of a diffuser 108 with a back diffuser 114 according to an embodiment of the present invention. The diffuser and back diffuser are formed from sheet metal and are on the perimeter 116 of a valve cone 102. The back diffuser extends into a slot 118 between diffusers and directs some of the liquid flowing through the slot back under the valve cone. Other types of back diffusers can be fabricated in different materials and embodiments.

III. Methods of Operation

General examples of methods of operation will be described, with specific embodiments described below in relation to flowcharts. The grapes, which are typically red wine grapes, but not necessarily so, are crushed into must, which is put into the fermentation tank and allowed to soak for 12–48 hours, typically. This is called the extraction phase and will be followed by what is called the fermentation phase. Pump-over cycles may be performed during one or both phases, depending on the starting material and desired product.

During the extraction phase, pump-over cycles typically begin and repeat every 2–6 hours, depending on the level of extraction required. Each pump-over cycle includes a programmable number of cap irrigations (typically 3–4). The must is pumped into the pump-over chamber and accumulated for a period of time, normally about 5–15 seconds, before the valve is slowly opened. In a particular system, the valve is opened about six inches over a 20–30 second period, and then closed at a relatively rapid rate. The pump continues to operate throughout the cycle, and the valve plate or cone provides a through wetting of the cap. Oxygenation, i.e. the injection of air or other gas through the venturi, is normally turned off during the extraction phase.

The entire extraction process can be programmed to run automatically through the system controller. Similarly, many different programs can be stored for running by the system controller. Programs can be entered from the front panel, or from a computer-readable source that was developed away from the fermentation system.

At the end of the extraction cycle, the system pauses to allow inoculation of the must with yeast. In a particular embodiment, a status light (ref. num 38, FIG. 1A) is lit to indicate that the system is waiting for operator input. Other status lights might indicate that the system is operating normally, or has shut down. In a particular system, a green-yellow-red panel of status lights is provided. After the winemaker has inoculated the must with yeast, he confirms inoculation, typically by pushing a button or entering a command on the system controller, and the fermentation phase begins.

The temperature is typically set to the desired fermentation temperature and maintained by the heat-exchanger jacket, which is coupled to a heating-cooling system that circulates a fluid through the jacket. The pump-over cycle is changed to begin every 4–12 hours, depending on the volume of liquid to be pumped over (usually 1.2–2 tank volumes (must volumes) per 24 hours).

During the fermentation phase, each pump-over cycle includes a programmable number of cap irrigations (normally 4) with an adjustable valve hold time of 5–15 seconds, which can be the same for each irrigation or varied within a pump-over cycle. In a particular embodiment, the last, e.g. fourth, cap irrigation has a valve hold time of 240–480 seconds. This allows the pump-over chamber to essentially fill (about 900 gallons). When the valve is opened, it is opened quickly, being completely opened in about 1 second. The rapid opening of the valve allows dumping of the liquid in the pump-over chamber into the fermentation chamber to mix the cap with the must in the fermentation chamber. The number of tank volumes per day is determined according to the pump-over chamber volume times the number of pump-over cycles in a 24-hour period.

It has been discovered that irrigating the cap prior to mixing is important to achieve efficient mixing, and that sufficient moistening of the cap can be achieved after 3 irrigation cycles, after which the cap can be mixed into the liquid.

Providing a two-speed valve actuator allows efficient irrigation of the cap and efficient mixing of the cap and must. Conventional pump-over fermentation-tanks with a single-speed valve actuator would compromise one or both phases, especially when used in conjunction with a disk valve. The disk valve directs much of the liquid to the sides and sidewalls of the fermentation chamber. This effect is exacerbated during a mixing cycle if the valve is opened slowly.

Oxygenation is typically turned on during fermentation to facilitate the growth of the yeast. Oxygenation is achieved by opening the venturi aeration control valve while must is being pumped through the venturi. The aeration control valve is typically opened only when the must is flowing through the pump-over pipe. Carbon dioxide generated by the yeast is typically vented through a bi-directional vent valve at the top of the chamber. A sterile filter is typically placed over the air side of the vent valve.

Fermentation continues until most of the sugar in the must is consumed by the yeast. In some instances, a post-fermentation maceration is desired. This maceration might last 2–3 days during which time 2–3 irrigation cycles are used to moisten the cap, without mixing. Oxygenation is usually turned off during post-fermentation maceration.

Finally, the "free run" wine is drained from the fermentation tank, typically into a secondary fermentor or other vessel. In some instances the fermentation is quenched to preserve some residual sugar. The fermentation tank is opened and the drained pomace is removed. The pomace can be processed through a wine press to extract more wine, which may be mixed back with the free run wine or kept separate.

Figure 3A:
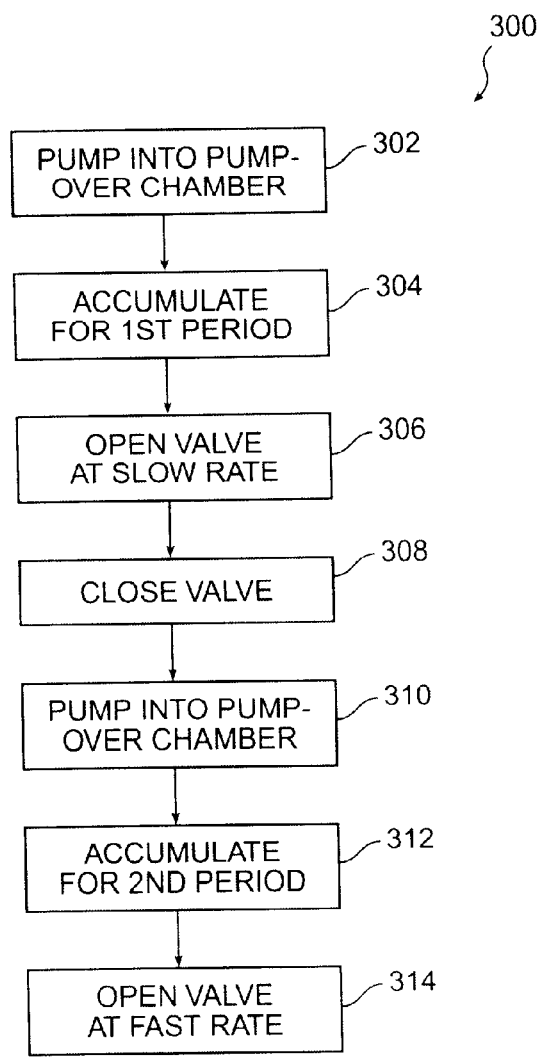
FIG. 3A is a simplified flow chart of a process of operating a fermentation tank according to an embodiment of the present invention.

FIG. 3A is a simplified flow chart of a process of operating a fermentation tank 300 according to an embodiment of the present invention. The term "fermentation tank" is used as a term of convenience. It is possible that the tank is operated without actual fermentation occurring. For example, the extraction could be carried out in the fermentation tank, and then the contents transferred to another tank for the fermentation.

Must is pumped from a fermentation chamber into a pump-over chamber (step 302) and accumulated for a selected period of time (step 304). A chamber valve is opened at a first selected rate (step 306) to irrigate the cap in the fermentation chamber, and then closed (step 308). Additional cap irrigations may be performed, if desired.

Must is then pumped again into the pump-over chamber (step 310) and accumulated for a second selected period of time (step 312). The chamber valve is opened at a second selected rate (step 314) to mix the cap with the must in the fermentation chamber. The first selected rate is less than the second selected rate, and in a particular embodiment is less than $1/10^{th}$ the second selected rate. In another embodiment, the first selected rate is less than or equal to $1/25^{th}$ the second selected rate.

In yet another embodiment, the opening of the chamber valve at the first selected rate opens the valve to a first position, and the opening of the chamber valve at the second selected rate opens the valve to a second position, where the second position is more open than the first position. In the first position, the partially open valve extends the irrigation time by restricting the flow between chambers. The decreasing level of liquid (head) in the pump-over chamber changes the spray pattern of the multi-directional movable valve member, facilitating irrigation of the surface of the cap.

Figure 3B:
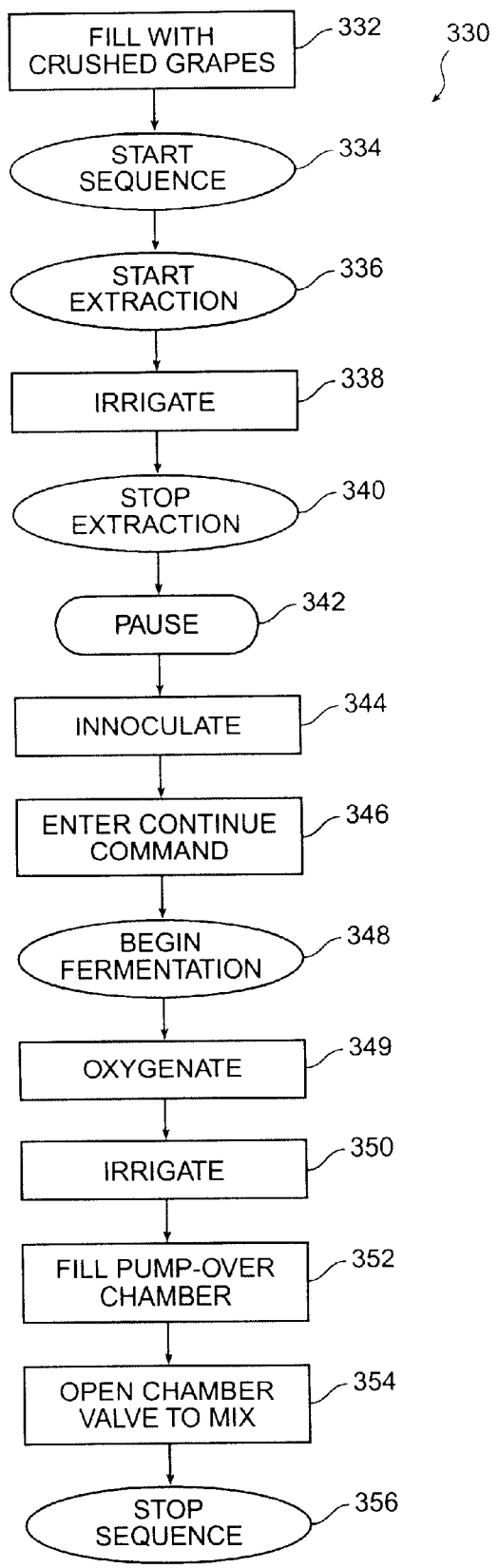
FIG. 3B is a simplified flow chart of process of operating a fermentation tank according to another embodiment of the present invention.

FIG. 3B is a simplified flow chart of a process of operating a computer-controlled pump-over fermentation tank 330 according to another embodiment of the present invention. A fermentation chamber of the computer-controlled pump-over fermentation tank is at least partially filled with crushed grapes (step 332), and the automatic process is started (step 334). An extraction phase is started (step 336) in which must is automatically pumped over the crushed grapes according to a selected irrigation cycle repeating on a selected irrigation cycle period to irrigate the crushed grapes (step 338). After the extraction phase ends (step 340), the automatic process pauses (step 342), allowing the winemaker to inoculate the crushed grapes (step 344). The winemaker enters a command (step 346) to continue the automatic process, which begins a fermentation phase (step 348).

During the fermentation phase, the pump-over chamber of the pump-over fermentation tank is at least partially filled with must (step 352) while a chamber valve between the pump-over chamber and the fermentation chamber is closed. A cap typically forms during the fermentation process, if not before, but no additional action is required to form the cap. The chamber valve is opened (step 354) to discharge the must from the pump-over chamber onto the cap to mix the cap with the must in the fermentation chamber. In a further embodiment, the cap is irrigated (step 350) prior to filling the pump-over chamber for the mixing step. Several irrigations can be performed prior to the mixing step, and the fermentation pump-over cycle is generally automatically repeated according to the control program. In a particular embodiment, three cap irrigations are performed before mixing the cap with the liquid, and the pump-over chamber is essentially filled before opening the chamber valve to mix the cap. Optionally, oxygenation can be turned on (step 349) during the fermentation pump-over cycles, or for a portion or portions of the fermentation pump-over cycles. When the fermentation phase has completed, the automatic process stops (step 356).

While the invention has been described above with reference to specific embodiments, other embodiments, modifications, or adaptations may become apparent to those skilled in the art. Therefore, the above embodiments are exemplary and the invention is to be determined according to the following claims.

What is claimed is:

1. A pump-over fermentation tank comprising:
a fermentation chamber separated from
a pump-over chamber by
a septum;
a pump configured to pump liquid from the fermentation chamber into the pump-over chamber through
a pump-over pipe; and
a chamber valve disposed in the septum to seal the fermentation chamber from the pump-over chamber in a closed position and to distribute liquid from the pump-over chamber over a surface of contents in the fermentation chamber in an open position, the chamber valve having
a movable valve member with
diffusers disposed on a perimeter of the movable valve member so as to direct liquid from the pump-over chamber over the surface of the contents in the fermentation chamber.

2. The pump-over fermentation tank of claim 1 further comprising slots between the diffusers on the perimeter of the movable member.

3. The pump-over fermentation tank of claim 1 wherein the diffusers provide at least bi-directional distribution of the liquid from the pump-over chamber over the surface of the contents in the fermentation chamber.

4. The pump-over fermentation tank of claim 1 further comprising back diffusers configured to direct liquid from the pump-over chamber toward a center of the fermentation chamber.

5. The pump-over fermentation tank of claim 1 wherein the movable valve member has a tapered valve face to self-center the movable valve member against a valve seat when closed.

6. The pump-over fermentation tank of claim 5 wherein the movable valve member is a valve plate.

7. The pump-over fermentation tank of claim 5 wherein the movable valve member is a valve cone.

8. The pump-over fermentation tank of claim 1 wherein the pump is a vortex impeller pump having
 an inlet tube of stainless steel tubing;
 an outlet tube of stainless steel tubing; and
 a vortex chamber fabricated from stainless steel sheet, the inlet tube and the outlet tube affixed to the vortex chamber.

9. The pump-over fermentation tank of claim 8 wherein the vortex impeller pump is driven by an electric motor having a rotational speed of less than about 1200 revolutions per minute.

10. The pump-over fermentation tank of claim 1 wherein the pump-over chamber has a pump-over chamber volume that is about 15% of a total fermentation tank volume.

11. The pump-over fermentation tank of claim 1 further comprising a venturi disposed in the pump-over pipe, the venturi having
 a high-pressure chamber coupled to
 a constricted section coupled to
 an expansion chamber; and
 an aeration tube having an outlet positioned within or proximate to the constricted section.

12. The pump-over fermentation tank of claim 1 further comprising a valve actuator coupled to the movable valve member and capable of opening the chamber valve at a first rate and at a second rate, the second rate being greater than the first rate.

13. A pump-over fermentation tank comprising:
 a fermentation chamber separated from
 a pump-over chamber by
 a septum;
 a vortex impeller pump having
  a vortex chamber fabricated from stainless steel sheet, the vortex impeller pump being configured to pump liquid from the fermentation chamber into the pump-over chamber through
 a pump-over pipe
 a chamber valve disposed in the septum to seal the fermentation chamber from the pump-over chamber in a closed position and to distribute liquid from the pump-over chamber over a surface of contents in the fermentation chamber in an open position, the chamber valve having
  a movable valve member with
   diffusers disposed on a perimeter of the movable valve member so as to direct liquid from the pump-over chamber over the surface of the contents in the fermentation chamber, and
   slots between the diffusers; and
 a valve actuator coupled to the movable valve member and capable of opening the chamber valve at a first rate and at a second rate, the second rate being greater than the first rate.

14. A pump-over fermentation tank comprising:
 a fermentation chamber separated from
 a pump-over chamber by
 a septum;
 a vortex impeller pump having
  a vortex chamber fabricated from stainless steel sheet, the vortex impeller pump being configured to pump liquid from the fermentation chamber into the pump-over chamber through
 a pump-over pipe; and
 a chamber valve disposed in the septum to seal the fermentation chamber from the pump-over chamber in a closed position and to distribute liquid from the pump-over chamber over a surface of contents in the fermentation chamber in an open position.

15. The pump-over fermentation tank of claim 14 further comprising a venturi disposed in the pump-over pipe, the venturi having
 a high-pressure chamber coupled to
 a constricted section coupled to
 an expansion chamber; and
 an aeration tube having an outlet positioned within or proximate to the constricted section.

16. The pump-over fermentation tank of claim 15 wherein the outlet of the aeration tube is disposed essentially at the center of the venturi.

* * * * *